May 10, 1949. A. T. FOSTER 2,469,595
COOKING APPARATUS
Filed Feb. 27, 1948
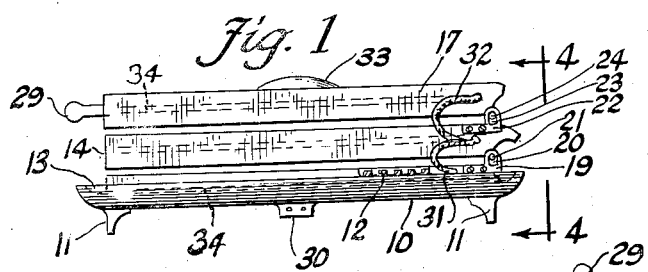
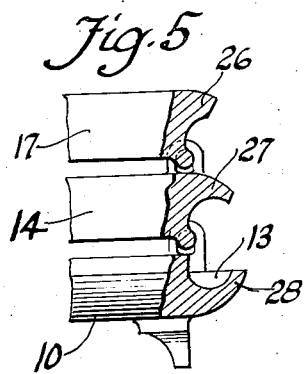
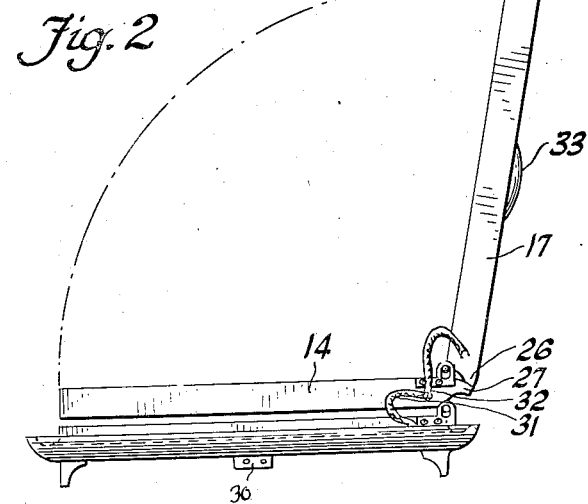
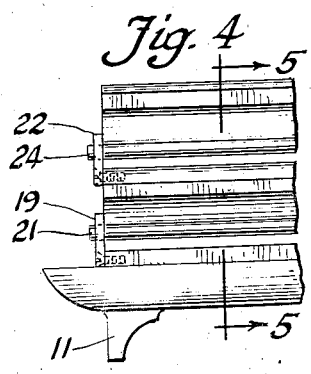
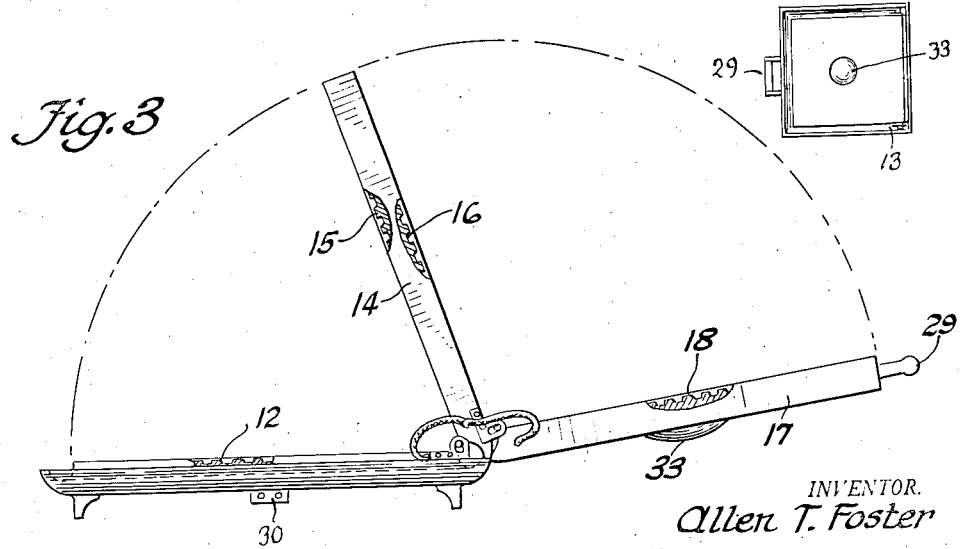
INVENTOR.
Allen T. Foster
BY
Sheridan, Davis & Cargill
Attorneys

Patented May 10, 1949

2,469,595

UNITED STATES PATENT OFFICE 2,469,595

COOKING APPARATUS

Allen T. Foster, Chicago, Ill.

Application February 27, 1948, Serial No. 11,539

6 Claims. (Cl. 99—374)

This invention relates to improvements in cooking apparatus.

One object of the invention is to provide an improved multiple platen cooking apparatus such as a waffle iron or the like having a base platen and two swingable platens superimposed upon the base platen providing two cooking or baking areas or spaces, and having means which enable the opening and closing movements of one of the swingable platens to be controlled by the manual movement of the other swingable platen.

A more specific object of the invention is to provide an improved waffle iron or like cooking utensil having a base platen and an upper and an intermediate platen in superposed relation swingably mounted on the base platen and arranged for cooperation whereby the upper platen can be swung manually independently of the intermediate platen to a given open position wherein the upper platen is retained in said open position or, whereby the upper platen can be moved to a second, more remote open position during which it entrains the intermediate platens for moving the latter to an open position, in which open positions the two platens are retained by gravity.

Other objects of the invention relate to the provision of an overflow trough common to the platens and to various features of construction and arrangement of parts which will be apparent from the consideration of the following specification and accompanying drawings, wherein:

Figure 1 is a side elevation of cooking apparatus exemplified by a waffle iron which is illustrative of the present improvements;

Fig. 2 is a side elevation of the improved waffle iron showing the upper platen swung to an open position in which it is sustained by cooperation with the intermediate platen;

Fig. 3 is a side elevation of the improved apparatus showing the upper and the intermediate platens in open positions wherein the intermediate platen is sustained by the upper platen;

Fig. 4 is an enlarged broken end elevation of the improved waffle iron looking in the direction of arrows 4—4 of Fig. 1;

Fig. 5 is an enlarged broken side elevation of the top, intermediate and base platens at the hinged edges thereof, illustrating the preferred formations at said edges by means of which the platens mutually cooperate during the opening movement thereof and while in the fully opened positions; and Fig. 6 is a top plan view of the waffle iron.

In the drawings of the waffle iron selected for illustrating the invention, 10 indicates generally a base platen which is shown as being provided with legs 11 and having a grid or other cooking surface 12. The cooking surface 12 may be of the grid form conventional in waffle irons. The platen 10 is shown as being provided with a perimetrical trough 13 which not only catches batter that overflows from the grid 12 but, as will be pointed out hereinafter, likewise serves to catch batter which may overflow from the superjacent platen.

Mounted upon the platen 12 is an intermediate platen 14, the lower surface of which comprises a grid 15 mating with the grid 12 while the upper surface comprises a grid 16 which cooperates with the lower surface of an upper platen 17. The grid surfaces of the upper platen is indicated by the numeral 18.

In the embodiment of the invention illustrated, the intermediate platen 14 is pivotally attached to the base platen 10 while the upper platen 17 is pivotally attached to the intermediate platen 14. Any appropriate pivotal connecting or hinge means may be provided for mounting the movable platens upon the base platen. In the structure disclosed, the base platen 10 is shown as being provided with ears 19 (one at each side) having vertical slots 20 therein into which projects a pintle or pivot member 21 which is shown as being integral with the lower portion of the intermediate platen 14. The upper platen 17 is shown as being pivotally or swingably connected to the intermediate platen by similar hinge means, that is, a hinge member 22 is provided at opposed sides of the platen 14 and each having a slot 23 into which projects the pintle 24 extending laterally from the respective sides of the platen 17. Other suitable types of hinge connections may be provided as will be apparent.

The platens are provided along the hinged edges thereof with cooperating formations by means of which the intermediate platen can be raised to the open position shown in Fig. 3 by movement of the upper platen manually to the position shown in said figure without the use of latches or catches operatively linking the two catches together. For example, the upper platen 17 is shown with a formation 26 adapted, upon movement of the upper platen to a given position shown in Fig. 2 and designated herein as the first open position, to engage the formation or abutment 27 formed on the corresponding edge of the intermediate platen 14. Further movement of the upper platen manually toward the second or remote open position of the upper platen shown in Fig. 3 entrains the intermediate platen 14 in its movement and will cause the intermediate platen to assume the position shown in Fig. 3 when the upper platen has been moved to the fully opened or second position shown in said figure. When the two platens have been moved to the positions shown in Fig. 3, the formation 27 of platen 14 will contact the formation 28 of the base platen 10, the formation 28 being, in the particular embodiment illustrated, the outer portion of the flange that defines the trough 13.

Referring to Fig. 2, it will be seen that the upper platen 17 is in stable relation in that it has been moved slightly beyond the vertical and is sustained in said open position by contact of the member 26 with the member 27. The upper platen is provided with a knob or handle 29 for convenient manual manipulation. If a single waffle only is to be baked, the batter may be placed upon the upper grid 16 of the intermediate platen 14 after the upper platen has been moved to the first open position. The upper platen 17 is then manually lowered to the horizontal, closed position, the slot of the hinge enabling the upper platen to adjust itself to the thickness of the batch of batter placed on the grid for cooking. In the event of any overflow of batter from the grid 14, it will drop into the trough 13 as will be obvious. Should it be desired to cook two waffles simultaneously, the upper platen 17 is moved to the remote or second open position shown in Fig. 3 in which it has closely approached a horizontal position although the angle assumed by the platen in the second position is not critical. During the movement of the platen 17 to the position just mentioned, it will have entrained the intermediate platen 14 in its movement as above described and will have moved it to the position thereof shown in Fig. 3; that is, through an arc of slightly less than 90°. The platen 17, when in the second open position shown in Fig. 3, will retain the intermediate platen 14 in its open position illustrated in said figure, that is, the angular disposition of the two platens is such that platen 17 restrains the platen 14 from gravitational movement to closed position. When the batter has been placed upon the grid 12 of the base platen 10, the platen 17 is moved manually to the first open position thereof shown in Fig. 2. During such movement, the intermediate platen 14 will have moved by gravity, under control of the platen 17, until it has assumed the horizontal cooking position shown in Fig. 2. After batter for a second waffle has been placed on the upper grid 16 of platen 14, the upper platen 17 is moved manually to the horizontal cooking position shown in Fig. 1.

It will be seen that the upper platen, when moved to the first open position shown in Fig. 2 is retained in that position by the abutment member 27 of the horizontal intermediate platen 14. The platen 17 cannot move by gravity beyond the position shown in Fig. 2 by reason of the fact that the moment exerted by it is less than the resistance offered by the horizontal platen 14. When the upper platen has been moved manually to the remote or second open position shown in Fig. 3, the intermediate platen is retained against gravitational closing movement since the moment exerted by it is less than the resistance offered by the substantially horizontal platen 17. As stated, the angle of repose of the platen 17 in the second open position may be varied, within limits, and still retain the intermediate plate in open position as described. Contact of the formation 27 with formation 28 prevents movement of the upper platen in a clockwise direction beyond the second open position shown in Fig. 3, in which position it will be spaced from the table for other support upon which the device is resting.

The present device is preferably of the type that is heated electrically and is provided with any suitable heating elements indicated diagrammatically and designated by the numeral 34. A suitable plug receptacle, by means of which the heating elements may be connected to a source of current, is indicated by the numeral 30. The heating elements of the several platens may be connected in parallel by means of flexible insulated conductors 31 and 32. If desired, a heat or bake indicator 33 may be provided on the upper platen 17.

While a waffle iron structure has been selected for the purpose of illustrating the invention, it will be apparent that the principal of the improvements must be utilized in multiple grid toasters or other cooking devices and hence, I do not wish to be restricted to the particular structure disclosed except as so limited by the appended claims.

I claim:

1. A cooking utensil comprising a horizontal base platen, an upper platen and an intermediate platen disposed in superposed horizontal relation on the base platen when in closed relation, means pivotally connecting the platens each to another along one side of the utensil to enable swinging movement of the upper and intermediate platens on horizontal axes to and from the respective closed positions, said upper platen being swingable manually from the horizontal closed position to a first open substantially upright position and from the latter position to approximately a horizontal second open position, and means for supporting the upper platen in said first open position against gravitational movement therefrom and for entraining said intermediate platen for swinging movement from the closed position thereof to an open position upon manual movement of said upper platen from said first open position to the second open position thereof.

2. A cooking utensil comprising a base platen, an upper platen and an intermediate platen disposed in superposed horizontal relation when the utensil is closed, means pivotally mounting the upper and intermediate platens upon the base platen to enable swinging movement of the upper and intermediate platens to and from said closed positions, said upper platen being swingable manually from the respective closed position to a first open position and from the latter position to approximately a second open position, and abutment members on said platens, the abutment members on said upper and intermediate platens cooperating to support said upper platen in said first open position when moved manually thereto and for entraining said intermediate platen for movement to an open position upon manual movement of said upper platen from said first to said second open position, said abutment member of said base platen cooperating with one of the other abutment members for arresting further swinging movement of said upper platen in said second open position.

3. A cooking utensil comprising a base platen, an upper platen and an intermediate platen disposed in superposed horizontal relation when the utensil is closed, means pivotally mounting the upper and intermediate platens upon the base platen to enable swinging movement of the upper and intermediate platens to and from said closed positions, said upper platen being swingable manually from the respective closed position to a first open substantially upright position and from the latter to an approximately horizontal second open position, cooperating members on said upper and intermediate platens for supporting said upper platen against gravitational movement beyond said first open position when arrested in said first open position and for entraining said intermediate platen for movement through an arc of less than 90 degrees to an open position upon manual movement of said upper platen from said first open position to said second open position, the angular disposition of said intermediate and upper platens when the latter is in said second open position being such that the upper platen restrains gravitational movement of the intermediate platen to closed position, and means for arresting swinging movement of the upper platen beyond said second open position.

4. A cooking device comprising a base platen, an upper platen and an intermediate platen arranged in superposed horizontal relation upon the base platen when in closed positions and pivotally mounted upon the base platen for swinging movement about axes along one side of the device, the upper platen being manually movable from the horizontal closed relation to a first open substantially upright position and beyond said first open position to a second open position approaching the horizontal, cooperating means on the upper and intermediate platens arranged to be moved into abutting contact upon manual movement of the upper platen to said first open position and to entrain said intermediate platen for swinging movement to an open position removed less than 90 degrees of arc from the respective horizontal position thereof upon manual movement of the upper platen from said first open position to said second open position, the relation of said upper and intermediate platens being such that the intermediate platen while in closed position restrains gravitational movement of the upper platen beyond the first open position and the upper platen while in the second open position restrains gravitational movement of the intermediate platen from the respective open position thereof to the closed position thereof.

5. A cooking device comprising a base platen, an intermediate platen and an upper platen hingedly mounted thereon normally in superposed horizontal closed relation, said upper and intermediate platens being arranged for swinging movement each about an axis disposed at one side of the device, said upper platen being manually swingable from said horizontal position to a first open position wherein the platen is disposed substantially upright and also swingable manually beyond said first open position to a second open position wherein the platen is disposed substantially at or a few degrees removed from the horizontal, and an abutment member carried by said upper platen and adapted to be moved into contact with the intermediate platen by the swinging movement of the upper platen to said first open position for selectively restraining gravitational movement of the upper platen beyond said first open position or for effecting the swinging movement of the intermediate platen to and supporting the same in an open position less than 90 degrees of arc removed from the respective closed position thereof upon manual movement of the upper platen from the first to the second open position thereof and for controlling the gravitational closing movement of the intermediate platen as the upper platen is moved manually from the second open position to the first open position thereof.

6. In a cooking device comprising a horizontal base platen, an intermediate platen disposed thereon and pivotally attached thereto for swinging movement to an open position disposed less than 90 degrees of arc from the horizontal position thereof whereby said intermediate platen tends to return gravitationally from the open to the horizontal position, an upper platen pivotally attached to said intermediate platen for manual swinging movement to a first open position from which said upper platen tends to swing gravitationally beyond said first open position, and cooperating abutment means on said upper and intermediate platens adapted to contact upon manual movement of the upper platen to said first open position to restrain said upper platen from gravitational movement beyond said first open position and adapted to swing said intermediate platen to the respective open position thereof upon manual swinging movement of said upper platen to a second open position wherein the upper platen is disposed at or a few degrees of arc removed from the horizontal and said abutment means being adapted to restrain said intermediate platen from gravitational closing movement to the respective closed positions and to control such closing movement of the intermediate platen upon manual swinging movement of the upper platen from the second to the first open position thereof.

ALLEN T. FOSTER.

REFERENCES CITED

The following references are of record in the file of this patent:

UNITED STATES PATENTS

| Number | Name | Date |
| --- | --- | --- |
| 1,754,800 | Preston | Apr. 15, 1930 |
| 1,759,832 | Banff | May 27, 1930 |
| 1,873,104 | Benson | Aug. 23, 1932 |